United States Patent [19]

Lechner

[11] 4,327,253

[45] Apr. 27, 1982

[54] CIRCUIT ARRANGEMENT FOR CONSECUTIVELY MONITORING OPERATING CONDITIONS OF DIRECT CURRENT DEVICES

[75] Inventor: Robert Lechner, Otterfing, Fed. Rep. of Germany

[73] Assignee: Siemens Aktiengesellschaft, Berlin and Munich, Fed. Rep. of Germany

[21] Appl. No.: 184,761

[22] Filed: Sep. 8, 1980

[30] Foreign Application Priority Data

Sep. 26, 1979 [DE] Fed. Rep. of Germany ....... 2938981

[51] Int. Cl.³ .............................................. H04M 3/22
[52] U.S. Cl. ................................................ 179/18 FG
[58] Field of Search ........... 179/18 AD, 18 FA, 18 F, 179/16 F, 170 R, 18 FG

[56] References Cited

U.S. PATENT DOCUMENTS 4,254,305  3/1981  Treiber ............................ 179/18 FA Primary Examiner—Thomas A. Robinson
Attorney, Agent, or Firm—Spellman, Joel and Pelton

[57] ABSTRACT

The circuit arrangement monitors operating conditions of consecutively sampled direct current devices. The operating conditions are represented by different potentials occurring at a sampling connector of each different direct current device. A selector unit has parallel signal inputs, each of which inputs is connected to a respective sampling point of a DC device. A comparator is coupled by a first input to a reference voltage source and by a second input to the output of the selector unit. An output of the comparator is connected to a shift register buffering the output signals of the comparator for one monitoring cycle. The selector unit and the shift register are commonly controlled for synchronous selecting operation and shifting, respectively. There is arranged a feedback network between the output of the shift register and the first input of the comparator for superposing a positive feedback signal on the reference voltage.

6 Claims, 2 Drawing Figures

CIRCUIT ARRANGEMENT FOR CONSECUTIVELY MONITORING OPERATING CONDITIONS OF DIRECT CURRENT DEVICES

BACKGROUND OF THE INVENTION

The invention is related to a circuit arrangement for monitoring operating conditions of a group of direct current devices, wherein the operating conditions are represented by different potentials occurring at a sampling point of each direct current device.

More specifically the invention is directed to such a circuit arrangement wherein the direct current devices to be monitored comprise subscriber line loops composed of a subscriber station, a subscriber line and a subscriber line interface circuit of a private branch exchange system (PBX).

There is provided an evaluating unit associated with a plurality of direct current devices which unit can be selectively through-connected to a sampling point of each direct current device. The evaluating unit has to sample specific voltage conditions and corresponding operating conditions of a DC device. As mentioned, a subscriber line loop can be one application for such a direct current device. In such a case, the different operating conditions correspond to open-loop or closed-loop conditions of the subscriber line loop. By monitoring these conditions, switching signals can be recognized for controlling functions and operations of the PBX. One example of such signals are dial tone signals. If each subscriber line interface circuit also employs an exchange supply fed into the circuit via supply resistors, the sampling connector may be a connecting point of one wire of the subscriber line which is connected to the supply resistor not directly coupled to the positive pole of the supply voltage.

The evaluating unit for monitoring consecutively potentials occurring at the different sampling points of the direct current devices is provided with a selector unit having inputs connected to respective sampling points. At the output side of the selector unit there is arranged a comparator for rating the through-connected potential occurring at a presently selected sampling point. The comparator is supplied by a predetermined reference voltage designating a threshold value for the operation of the comparator. Determined by the value of the threshold level two measuring ranges can be distinguished which ranges correspond to two possible operating conditions of the DC devices.

As long as at a specific sampling time the present potentials to be measured are definitely distinguished from the predetermined threshold value there will be a true output signal of the comparator which is definitely associated with one of these two ranges, i.e. a respective operating condition of the direct current device. The value of the potential to be measured, however, also may be approximately equal to the threshold value. In such a case, measures have to be taken that small changes of the value to be measured which can result from superposing noise do not effect a false state of the output signal. This means that any insignificant variation of the measured potential should not give rise to a change of the output signal.

It is known in general to provide comparators for comparing two voltages with an additional positive feedback network arranged between the comparator's output and the non-inverting input for achieving a hysteresis characteristic. However, such a directly connected feedback network cannot be used in the present design. Measurements of potentials at consecutively selected sampling points could interfere with each other, thus invalidating possibly even the evaluation of a potential which is in itself quite definitely separated from the threshold level.

It is, therefore, an object of the present invention to improve known circuit arrangements for monitoring operating conditions in such a manner that critical sampling conditions are effectively excluded.

Another object of the invention is to improve the circuit arrangement in such a manner that even in a critical case a true output signal of the comparator can be obtained which is definitely associated with one of two operating conditions.

SUMMARY OF THE INVENTION

There is disclosed a circuit arrangement for monitoring operating conditions of a group of direct current devices, the operating conditions represented by different potentials occurring at a sampling point of each of the direct current devices. There is provided a selector unit having parallel signal inputs, an output and a control input. At the control input an address control signal for activating selectively each one of the signal inputs during a monitoring cycle is received. Each of the signal inputs is connected to a respective sampling point of one of the direct current devices. There are arranged means for generating an address control signal train, which means have an output connected to the control input of the selector unit. A comparator is connected by its first input to the output of said selector unit. A second input of the comparator is coupled to a voltage source for generating a reference voltage with respect to the potentials to be monitored at the sampling points. Furthermore, there are provided means for buffering output signals of the comparator for one monitoring cycle for providing feedback superposing on the reference voltage.

According to the present invention each result of a monitoring operation is buffered for an entire monitoring cycle and is again at disposal during a following monitoring cycle. The respective output signal corresponding to the result of a previous monitoring operation occurs at the output of the buffering means synchronously at a time when the same sampling point is monitored again. This offers the possibility to use this signal as a feedback signal for adjusting the threshold level of the comparator in accordance with the state of the buffered output signal automatically and individually with respect to a specific sampling point.

The output signal of the previous monitoring operation is superposed as a positively rated feedback signal on the reference voltage thus establishing an individually adjusted threshold value. The direction of the adjustment of the threshold level is chosen such that a slight change of the measured potential between two consecutive monitoring cycles may not effect a change of operation of the comparator. More specifically, the positive feedback of the previous output signal of the comparator is superposed on the reference voltage in such a manner that a high output signal reduces the effective reference voltage at the input of the comparator, and vice versa. Thereby it is ascertained that the comparator can change its operating condition only if the potential currently to be measured differs from the previously sampled potential to an extent which is higher than the adjusting difference of the threshold levels.

According to a preferred embodiment of the invention, the buffering means is composed of a shift register having a number of shift sections which is identical with the number of selectable sampling points associated with the selector unit. The shift register is triggered by a clock pulse train which corresponds in frequency to the address control signal. In a variety of applications the shift register meets two requirements. Besides supplying delayed output signals at proper times for deriving feedback signals, output signals of the comparator can be shifted into that register at predetermined moments within a monitoring interval. Such timing of sampling the output signals of the comparator often is applicable to assure that the output signals used for further control purposes are obtained in a steady state condition of the evaluating unit for avoiding a mis-interpretation.

According to a further preferred embodiment of the invention, the rating means are composed of a voltage divider for providing a positive feedback. The voltage divider is formed of resistors connected in series via respective connector taps and is arranged between the reference voltage and ground.

One of the connector taps is connected to the second input of the comparator. At the second connector tap an output signal of a buffer amplifier arranged at the output of the buffering means is received. The comparator in accordance with the present invention is preferably composed of an integrated differential amplifier, such as an operational amplifier.

BRIEF DESCRIPTION OF THE DRAWINGS

A better understanding of the invention may be had by reference to the following description of a preferred embodiment in conjunction with the accompanying drawings.

DESCRIPTION OF THE PREFERRED EMBODIMENT

Figure 1:
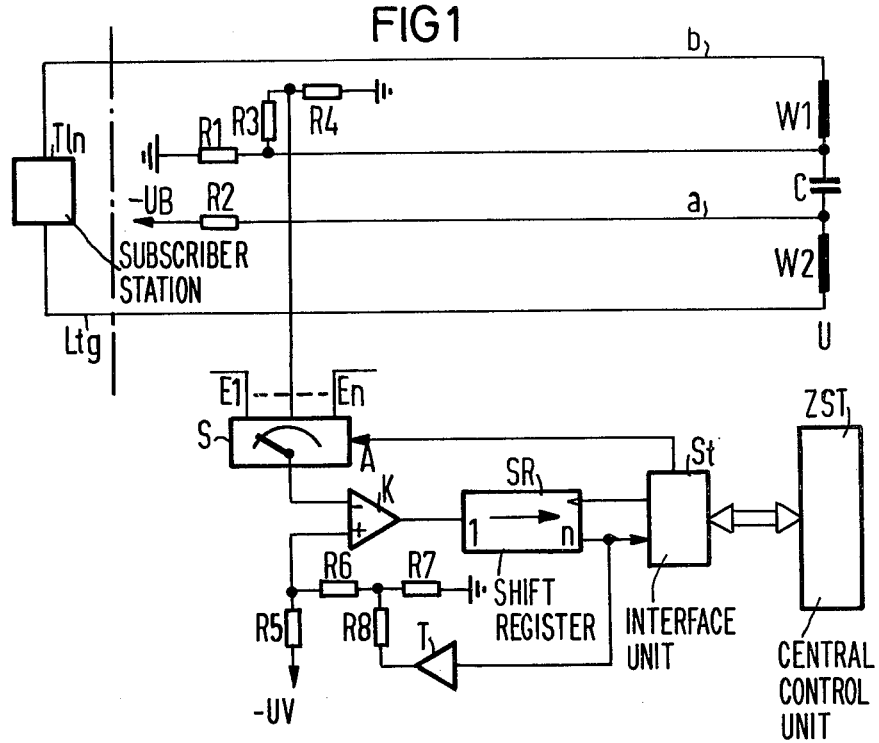
FIG. 1 shows a block diagram of a circuit arrangement for monitoring operating conditions of a group of direct current devices by evaluating potentials at a sampling point of the DC device.

The circuit diagram of FIG. 1 represents just the devices and components which are necessary for a better understanding of the invention. All additional circuits which may be optional with the chosen direct current device have been omitted. For sampling measuring voltages at sampling points of direct current devices to be monitored, there is provided a selector unit S. This selector unit may be composed of a commercially available integrated multiplexor having a plurality of signal inputs E1 through En. Address inputs A receive a selecting address dependent upon which address one of the inputs E1 through En is through-connected to an output. Each of the inputs E1 through En is connected to the sampling point of a respective one of the direct current devices associated with the selector unit S. In FIG. 1 just one of these direct current devices is shown. Dependent upon the addresses supplied, each of the associated direct current devices can be selected in any given order or consecutively, wherein the addresses are incremented by one for each following monitoring interval.

The direct current device of this embodiment is represented by a subscriber line loop including a subscriber station Tln, a subscriber line Ltg and a subscriber line interface circuit. This circuit interfaces the subscriber station Tln with a four-wire transmission line of a private branch exchange system by means of a hybrid circuit U. The hybrid circuit, very well known in the art, is represented in FIG. 1 by two primary windings W1 and W2 interconnected by a capacitor C. The first primary winding W1 is inserted into the R-wire b and thereby connected to the subscriber station Tln. The second connector of the first primary winding W1 connected to the capacitor C also forms the connector tap of the R-wire b to a voltage supply circuit. A first resistor, the first supply resistor R1 is inserted between this connector tap and ground. Accordingly, the A-wire a of the subscriber line Ltg is associated with the second primary winding W2 having correspondingly a connector tap connected to capacitor C and, as indicated by an arrow referenced -UB, to the negative pole of a charge battery, not shown, via a second supply resistor R2. The capacitor C, thus, bridges both the R-wire b and the A-wire a. The secondary windings of the hybrid circuit U established for decoupling the DC circuit of a calling subscriber station from a transmission line connected to a called subscriber station are not shown, since hybrid circuits are very well known in the art and the operation of a hybrid circuit itself is not part of the invention. This also applies to further components of the subscriber line interface circuit such as means for generating ring tone signals coupled to the subscriber line by further coupling devices such as a ring signal transformer.

Dependent upon the operating condition of the subscriber line different potentials occur at supply resistors R1 and R2. These different potentials represent for example the off-hook condition of a handset, dialing signals and other control signals which are to be recognized by a specific voltage drop at a supply resistor, e.g. the first supply resistor R1.

In an open-loop condition of the subscriber line potentials established are determined by the value of the supply voltage and by leakage resistances of the line. This resistance should be high. Thus, the potential on the A-wire a should be almost equal to the negative supply voltage -UB and the potential on the R-wire b should be almost zero. In the closed-loop condition of the subscriber line the voltage difference between the two wires a and b should drop to a small potential difference which is dependent upon the value of the loop resistance. The potential at the connector tap of the R-wire and the first supply resistor R1 correspondingly changes to a voltage drop which is determined by the value of this resistance and the current flowing through the line.

By measuring this voltage at the connector tap of the first supply resistor R1 and the R-wire b the operating condition of the subscriber line thus can be recognized. This is achieved by means of a voltage divider comprising two further resistors R3 and R4 inserted between ground and the connector tap of the R-wire b to the first supply resistor R1. The connector tap between these resistors R3 and R4 is the sampling point for monitoring the potentials at the connector tap of the first supply resistor. The only purpose of the voltage divider is to adjust the voltages to be measured to voltage values of a range which is acceptable with known integrated circuits.

As mentioned, a group of such subscriber lines can be connected to the inputs E1 through En of selector unit S. The number of the elements of the group is limited by the number n of inputs of the selector unit S. Each of these inputs is connected to a corresponding sampling point of an individual subscriber line loop. It may be mentioned that also a plurality of selector units S can be arranged in parallel if the number of direct current devices to be monitored exceeds the numbers of inputs of one selector unit. The parallel arrangement of selector units S refers to parallel address inputs A and commonly connected outputs whereas each selector unit is associated with a group of direct current devices, as described.

At the output side of the selector unit S there is arranged a comparator K having an inverting input (−) and a non-inverting input (+). The inverting input of the comparator K is connected to the output of selector unit S. The non-inverting input of comparator K is supplied with a reference voltage which is derived from the voltage of a reference voltage source UV by means of a further voltage divider comprising further resistors R5 through R7. The value of the reference voltage fed to the non-inverting input of comparator K is determined such that in consideration of permissible leak resistances and tolerances of the effective line resistance of the operating conditions and corresponding ranges of potentials to be monitored associated with the open-loop and the closed-loop condition can be separated distinctively. It can be advisable to apply to the non-inverting input of comparator K additionally a further stabilizing voltage obtained at a connecting point of two high resistors cross-connecting the two wires a and b of the subscriber line. In such a manner, noise resulting from interfering voltages which may be induced into the subscriber line by an adjacent power main can be balanced. Such interfering voltage components are thus supplied to both inputs of comparator K with identical values, phases and frequencies and are eliminated by comparator K amplifying voltage differences.

Obviously, such an additional balancing voltage component may be supplied to comparator K by an additional selector unit arranged in parallel to the selector unit S for sampling this balancing voltage component synchronously.

Depending upon the value of the sampled measuring voltage beyond or beneath the given reference voltage a definitely distinguished output signal of comparator K will occur. The output signal may correspond to logic level "0" or logic level "1". In the considered embodiment of the invention an output signal having a logic level "1" corresponds to a closed-loop condition of the monitored subscriber line, since the measured potential supplied to comparator K is higher than the given value of the reference voltage.

At the output of comparator K there is arranged a shift register SR having a plurality of stages corresponding to the number of inputs of selector units S as indicated by numerals 1 through n. The shift register SR is triggered by a clock pulse in such a manner that its contents are shifted stepwise after a monitoring interval or sampling operation. Obviously this clock pulse train can be derived from the address information for the selector unit S. In the present embodiment of the invention address information for selector unit S and the clock pulse train for the shift register SR are generated by a central control unit ZST and are delivered by an interface unit St which is inserted between that central control unit, on the one hand, and selector unit S and the shift register SR, on the other hand.

Assuming that several groups of direct current devices to be monitored are associated with further selector units S, as mentioned, each of these groups will be monitored by activating the respective selector unit one after another in an order determined by the central control unit ZST. A monitoring cycle is completed when all these different groups of direct current devices have been monitored. In the following cycle, sampling points will be selected again in the same and given order. Selector unit S will again be activated to sample the different subscriber line interface circuits in correspondence with address information supplied to its address input A. During this following monitoring cycle at the time of each monitoring interval, shift register SR delivers an output signal which corresponds to the evaluated measuring potential of one and the same sampling point which is presently selected.

This output signal of the shift register SR is supplied to the interface unit St and from there transmitted as a binary signal to the central control unit ZST. Under control of this input signal the central control unit ZST starts in a conventional manner procedures of a private exchange system for a call-set up or a call-release which do not form a part of the present invention and are not described in detail.

The output signal of shift register SR also is supplied to the input of a feedback network connected to the non-inverting input of comparator K. At the input of this feedback network there is arranged a buffer amplifier T. Its output is connected to a connector tap of resistors R6 and R7 via a further resistor R8. The resistors R6 and R7 form part of a voltage divider supplying the reference voltage to the non-inverting input of comparator K. Thus the presently effective threshold value of comparator K is adjusted in dependence upon the result of the previous monitoring interval.

The adjusted reference voltage is composed of a reference voltage superposed by a voltage component corresponding to the result of the previous monitoring interval of one and the same sampling point. This is established in such a manner that the effective threshold value of comparator K by means of a positive feedback is slightly driven into a direction which can only result in an inverted output signal of comparator K if the presently occurring potential differs from the previously sampled potential considerably.

Assuming a measurement potential which value is approximately of the given threshold value, by the measure described, an insignificant change of the measuring voltages which can result from noise will not affect the output signal of comparator K. A change of the output signal of comparator K will occur only if the sampled measuring voltage changes to an extent which exceeds the threshold level adjusted by the superposing voltage component. In the present embodiment of the invention, leakage resistances have to be taken into account which may affect measuring potentials to an extent that these approximately equal a predetermined threshold value. Even in such a case, oscillating of the comparator i.e. output signals of alternating logic levels are avoided. This is true within a voltage range which is determined by the individual adjustment of the threshold value of comparator K. Only measurements exceeding such adjustment result in a change of the comparator output signal.

Figure 2:
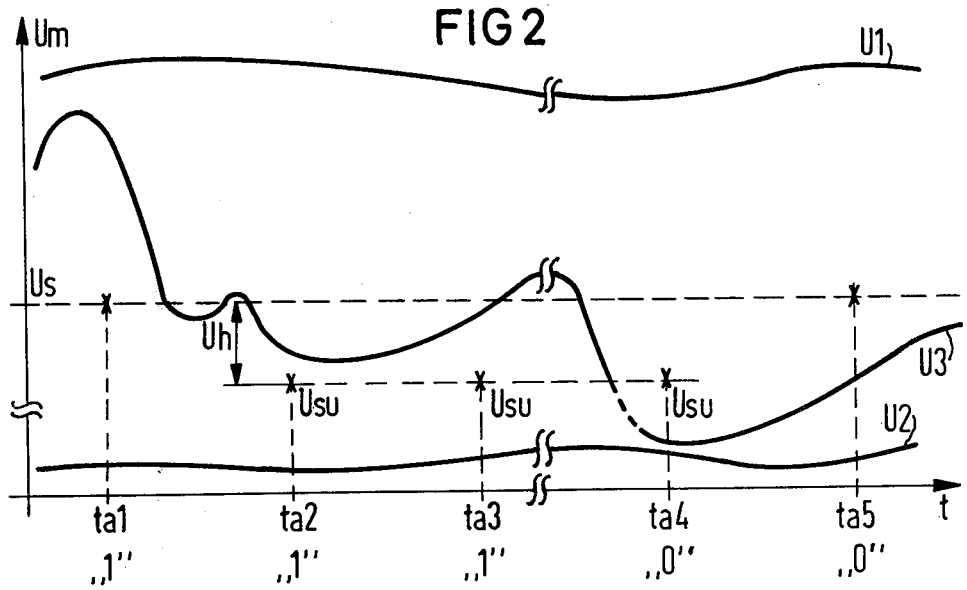
FIG. 2 shows a graph of wave forms of signals occurring at consecutive sampling times for indicating the operation of the circuit arrangement of FIG. 1.

Details of this measure will now be obtained from the following description of the operation of comparator K with reference to FIG. 2 showing a graph with various wave forms of potentials occurring at a sampling point under different operating conditions of the subscriber line loop. The graph represents the gradient of measuring potentials Um over the time t. Three different conditions are displayed. Wave forms designated by U1 and U2 refer to potentials associated with operating conditions which can be evaluated definitely by comparator K with respect to a threshold value Us. In any case distinctive results can be obtained in each of the monitoring intervals indicated by sampling times ta1 through ta5.

The values of the potential represented by wave form U1 correspond to values occurring in a closed-loop condition of a subscriber line. As described, this condition is determined by an output signal of comparator K corresponding to logic level "1". Measuring values of the potential represented by the second wave form U2 are associated with an open-loop condition of the subscriber line, correspondingly the output signal of comparator K has logic level "0".

The output signals of comparator K, indicated in FIG. 2 in the bottom line with reference to a respective one of the sampling times ta1 through ta5, refer to the third wave form U3. This wave form represents a potential gradient which is relatively close to the threshold voltage Us of comparator K. For this example, it is assumed that the potential at sampling time ta1 is distinctively distinguished from the threshold value Us. Noise superposing on the useful signal then affects the occurring potential in such a manner that its absolute value at the following sampling time ta2 is slightly lower than the threshold value. Would a fixed threshold be used, different results would be obtained at both times resulting from such superposing noise. This misinterpretation is avoided in that dependent upon the result of the previous monitoring interval the threshold value for the following monitoring operation automatically is adjusted to some extent. The output signal of comparator K at monitoring time ta1 has logic level "1". This high condition causes the threshold value at the following monitoring time ta2 to be reduced by a small amount which is designated by Uh.

Correspondingly the effective threshold value at the second sampling time ta2 is given by a potential value Usu. Comparator K will not follow the change of the potential to be monitored and will still generate an output signal corresponding to logic level "1". The same operation also applies to the operation at the third sampling time ta3.

Between the third sampling time ta3 and the fourth sampling time ta4 there occurs a considerable voltage drop of the potential to be measured. This sudden change is recognized by comparator K, since the measured potential is now definitely lower than even the reduced threshold value Usu. This change of the condition of comparator K results in that the threshold value at monitoring time ta5 again is re-adjusted to the higher normal threshold value Us. This value will be in effect as long as the potential to be monitored does not exceed it. If the potential to be monitored again exceeds the present threshold value the output signal of comparator K will change and resulting from that the threshold value will be reduced again.

This automatical "floating" of the threshold value determined by previous measuring results ascertains that only changes which are larger than a predetermined noise level can change the condition of comparator K. Generally no change of operating condition will be effected by a superposing noise component itself and any change in the operating condition of the monitored subscriber line loop will result in a true output signal of comparator K.

There has thus been shown and described a novel circuit arrangement for monitoring operating conditions of consecutively sampled direct current devices which fulfills all the objects and advantages sought therefore. Many changes, modifications, variations and other uses and applications of the subject invention will, however, become apparent to those skilled in the art after considering the specification and the accompanying drawings, which disclose a preferred embodiment thereof. All such changes, modifications, variations and other uses and applications which do not depart from the spirit and scope of the invention are deemed to be covered by the invention which is limited only by the claims which follow.

What is claimed is:

1. Circuit arrangement for monitoring operating conditions of a group of direct current devices, said operating conditions represented by different potentials occurring at a sampling point of each of said direct current devices, said circuit arrangement comprising:
   (a) a selector unit having parallel signal inputs, an output and a control input for receiving an address control signal for activating selectively each one of said signal inputs during a monitoring cycle, and each of said signal inputs being connected to the sampling point of a respective one of said direct current devices;
   (b) means for generating an address control signal train and having an output connected to said control input of said selector unit;
   (c) a comparator having a monitoring signal input, a reference signal input and an output carrying control signals, and said monitoring signal input being connected to the output of said selector unit;
   (d) a voltage source for generating a basic reference voltage for comparison to said potentials to be monitored at said sampling points, said voltage source being coupled to said reference signal input of said comparator;
   (e) means for buffering said control signals for one monitoring cycle, said buffering means having an input connected to said output of said comparator and an output for supplying said control signals delayed by one monitoring cycle; and
   means for rating the delayed control signals and for providing feedback of the rated control signals to said reference signal input of said comparator wherein the rated control signals are superposed on said basic reference voltage for establishing an adjustable reference voltage level dependent on the operating condition of the respective monitored device during the previous monitoring cycle.

2. The circuit arrangement as recited in claim 1, wherein said buffering means is composed of a shift register having a number of shift sections which is identical with the number of selectable sampling points associated with said selector unit and having a clock pulse input for receiving a shift clock pulse train corresponding in frequency to said address control signals.

3. The circuit arrangement as recited in claim 2, wherein said generating means comprises a control unit for generating a train of address control signals and a derived train of shift clock pulses having outputs connected to said control input of said selector unit and said clock pulse input of said shift register, respectively, and having a signal input connected to said output of said shift register.

4. The circuit arrangement as recited in claim 1, wherein said rating means further comprise:
   (f1) a voltage divider composed of resistors connected in series via a connector tap and arranged between said reference signal input of said comparator and ground; and
   (f2) a buffer amplifier having an input connected to the output of said buffering means and an output connected to said connector tap.

5. The circuit arrangement as recited in claim 1, wherein the comparator is composed of an integrated differential amplifier.

6. The circuit arrangement as recited in claim 1, wherein the direct current devices comprise subscriber line loops of a private branch exchange composed of a subscriber station, a subscriber line and a subscriber line interface circuit.

* * * * *